(12) United States Patent
Tang et al.

(10) Patent No.: US 8,977,871 B2
(45) Date of Patent: Mar. 10, 2015

(54) SYSTEM AND METHOD FOR POWER MANAGEMENT USING A BASIC INPUT OUTPUT SYSTEM

(75) Inventors: Di Tang, Shanghai (CN); Vincent Zimmer, Federal Way, WA (US); James Edwards, Portland, OR (US); Rahul Khanna, Portland, OR (US); Yufu Li, Shanghai (CN); Abdul Bailey, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 404 days.

(21) Appl. No.: 13/107,133

(22) Filed: May 13, 2011

(65) Prior Publication Data

US 2012/0159204 A1 Jun. 21, 2012

(51) Int. Cl.
G06F 1/00 (2006.01)
G06F 1/32 (2006.01)

(52) U.S. Cl.
CPC .................................. *G06F 1/3203* (2013.01)
USPC ......................................... 713/310; 713/320

(58) Field of Classification Search
USPC .......... 713/300, 310, 320, 321, 322, 323, 324, 713/330
See application file for complete search history.

(56) References Cited

U.S. PATENT DOCUMENTS

| 5,437,021 A | 7/1995 | David et al. | |
|---|---|---|---|
| 5,630,142 A * | 5/1997 | Crump et al. | 713/323 |
| 6,065,122 A | 5/2000 | Wunderlich et al. | |
| 8,327,363 B2 * | 12/2012 | Gopalan et al. | 718/102 |
| 8,607,040 B2 | 12/2013 | Zimmer et al. | |
| 2001/0003207 A1 * | 6/2001 | Kling et al. | 713/320 |
| 2005/0166074 A1 * | 7/2005 | Hack | 713/320 |
| 2010/0125752 A1 | 5/2010 | Chen et al. | |

FOREIGN PATENT DOCUMENTS

| CN | 1308263 | 8/2001 |
|---|---|---|
| WO | WO-2005029300 | 3/2005 |

OTHER PUBLICATIONS

International Search Report and Written Opinion for PCT Application No. PCT/CN2010/002106 Mailed Oct. 13, 2011, 9 Pages.
Non-Final Office Action for Japanese Patent Application No. 2013-544993 mailed Jul. 1, 2014, 3 pages.
Non-Final Office Action for Korean Patent Application No. 10-2013-7015286 mailed Jul. 22, 2014, 13 pages.

* cited by examiner

*Primary Examiner* — Kim Huynh
*Assistant Examiner* — Paul J Yen
(74) *Attorney, Agent, or Firm* — Blakely, Sokoloff, Taylor & Zafman LLP

(57) ABSTRACT

A system comprises a plurality of processor cores. The processor cores may comprise one or more application processor (AP) cores and a boot strap processor (BSP) core. A basic input/output system (BIOS) comprises an I/O device module to call a stall function in response to an I/O operation, a power management module that couples to the I/O device and a timer module that couples to the power management module. The power management module is to adjust a timer period of the timer module based on a stall delay of the stall function. The power management module may hook the stall function and compare the stall delay with a predetermined threshold and set the timer period to the stall delay in response to determining that the stall delay is longer. The power management module may put the BSP in a sleep mode during the timer period to save power.

12 Claims, 7 Drawing Sheets

SYSTEM AND METHOD FOR POWER MANAGEMENT USING A BASIC INPUT OUTPUT SYSTEM

CROSS REFERENCE TO RELATED APPLICATIONS

This application claims the benefit of PCT Patent Application No. PCT/CN2010/002106, filed Dec. 21, 2010, and entitled, "SYSTEM AND METHOD FOR POWER MANAGEMENT."

BACKGROUND

Many digital/electronic systems may consume power when the systems are operating. Even in an event that one or more components or subsystems in an electronic system are idle, the one or more subsystems may still consume power. For example, in a computing system, one or more processors in the computing system may unnecessarily consume power when the system does not use full computational capabilities of the one or more processors. Some systems may utilize an operating system (OS) to put processors into a low power mode.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques to provide a usage model to provide a reduced power consumption mode. The implementation of the techniques is not restricted in computing systems; it may be used by any execution environments for similar purposes, such as, for example, any other digital/electronic device. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures and full software instruction sequences have not been shown in detail in order not to obscure the invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

The following description may include terms, such as first, second, etc. that are used for descriptive purposes only and are not to be construed as limiting.

Figure 1A:
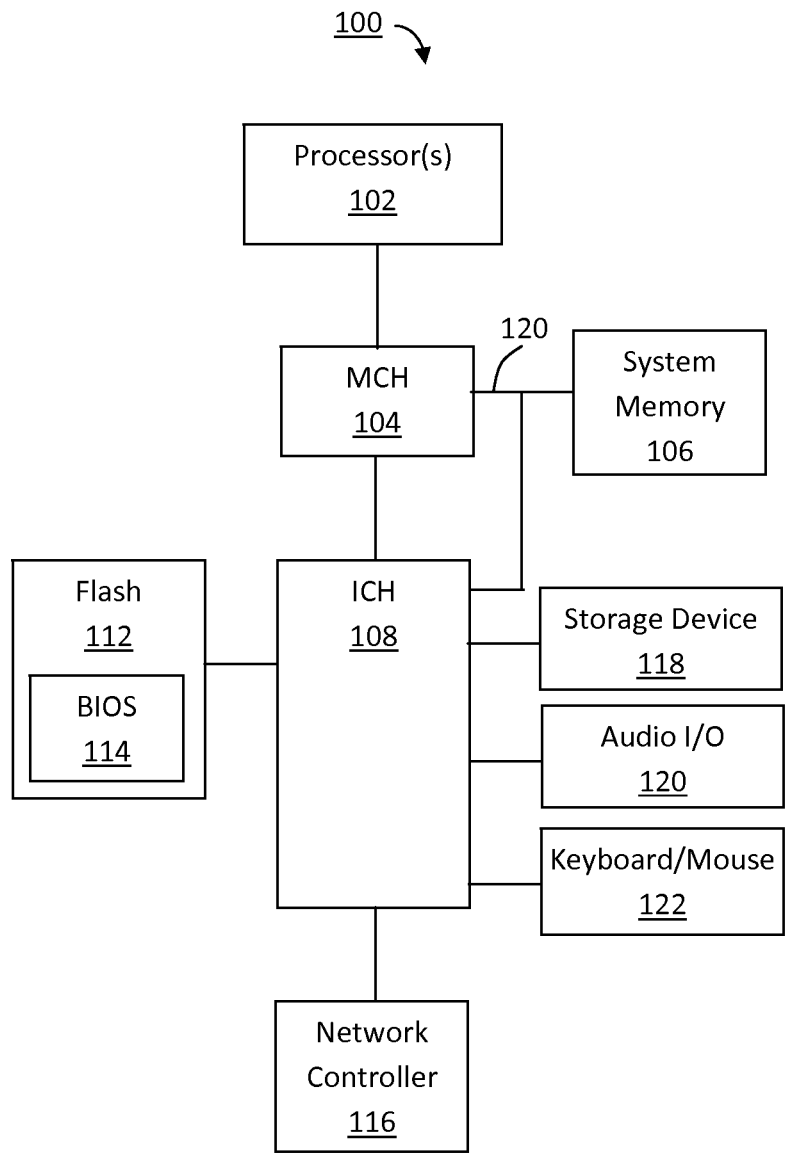
FIG. 1A is a block diagram of an exemplary system according to an embodiment of the invention.

FIG. 1A illustrates a block diagram of an exemplary embodiment of a system 100. The system 100 may comprise a processor 102. Processor 102 may comprise any type of processors capable of executing software and/or process data signals. In an embodiment, processor 102 may comprise a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor such as a microprocessor, digital signal processor or microcontroller.

Although FIG. 1A shows only one such processor 102, there may be one or more processors in the system 100 and one or more processors may include multiple threads, multiple cores, or the like. The present enhancement is not limited to computing systems. Alternative embodiments of the present invention can be used in any form factor devices that uses unified extensible firmware interface (UEFI) Basic Input/Output System (BIOS), such as handheld devices and embedded applications. Some examples of handheld devices include cellular phones, Internet Protocol devices, digital cameras, personal digital assistants (PDAs), or handheld PCs such as netbook or notebook. Embedded applications can include a micro controller, a digital signal processor (DSP), system on a chip, network computers (NetPC), set-top boxes, network hubs, wide area network (WAN) switches, or any other system.

The processors 102 may be coupled to a system logic chip 104. For example, the system logic chip 104 in the illustrated embodiment may be a memory controller hub (MCH). In one embodiment, the MCH 104 may provide a memory path 120 to system memory 106 for instruction and data storage and/or for storage of, e.g., graphics commands, data and textures. The memory path 120 may comprise a memory bus. The MCH 104 may direct data signals between processor 102, system memory 106, and other components in the system 100 and bridge the data signals between processor 102, system memory 106, and system I/O. Memory 106 may be a hard disk, a floppy disk, random access memory (RAM), read only memory (ROM), flash memory, or any other type of medium readable by processor 102.

MCH 104 may be coupled to an I/O controller hub (ICH) 108 via a local I/O interconnect. In an embodiment, the local I/O interconnect may be a high-speed I/O bus, such as peripheral component interconnect (PCI) bus. ICH 108 may provide connections to one or more I/O devices, e.g., via a local I/O interconnect. Some examples may comprise data storage device 118, audio I/O 120, keyboard/mouse I/O 122, and a network controller 116, or other integrated I/O components such as integrated driver electronics (IDE), local area network (LAN) and serial expansion port such as universal serial bus (USB), PCI slots (not shown), wireless transceiver, legacy I/O controller or the like. The data storage device 118 may comprise a hard disk drive, a floppy disk drive, a CD-ROM device, a flash memory device, or other mass storage device.

Referring to FIG. 1A, non-volatile memory, such as flash memory 112, may be coupled to ICH 108 via, e.g., a low pin count (LPC) bus. The BIOS firmware 114 may reside in flash memory 112 and boot up may execute instructions from the flash memory, or firmware. Although FIG. 1A illustrates BIOS firmware 114 in flash memory 112, in some embodiments, BIOS firmware 114 may be stored in other non-volatile memory such as a firmware hub, or the like. In an embodiment, BIOS firmware 114 may be implemented by Unified Extensible Firmware Interface (UEFI) firmware or any other firmware.

Although FIG. 1A illustrates the system 100, the embodiments according to the invention may be used in any other hardware architecture such as a platform using a plurality of processor cores or a platform using a processor or a coprocessor, a platform using I/O hubs, or memory control embedded within the processors, or the like, may be used.

Figure 1B:
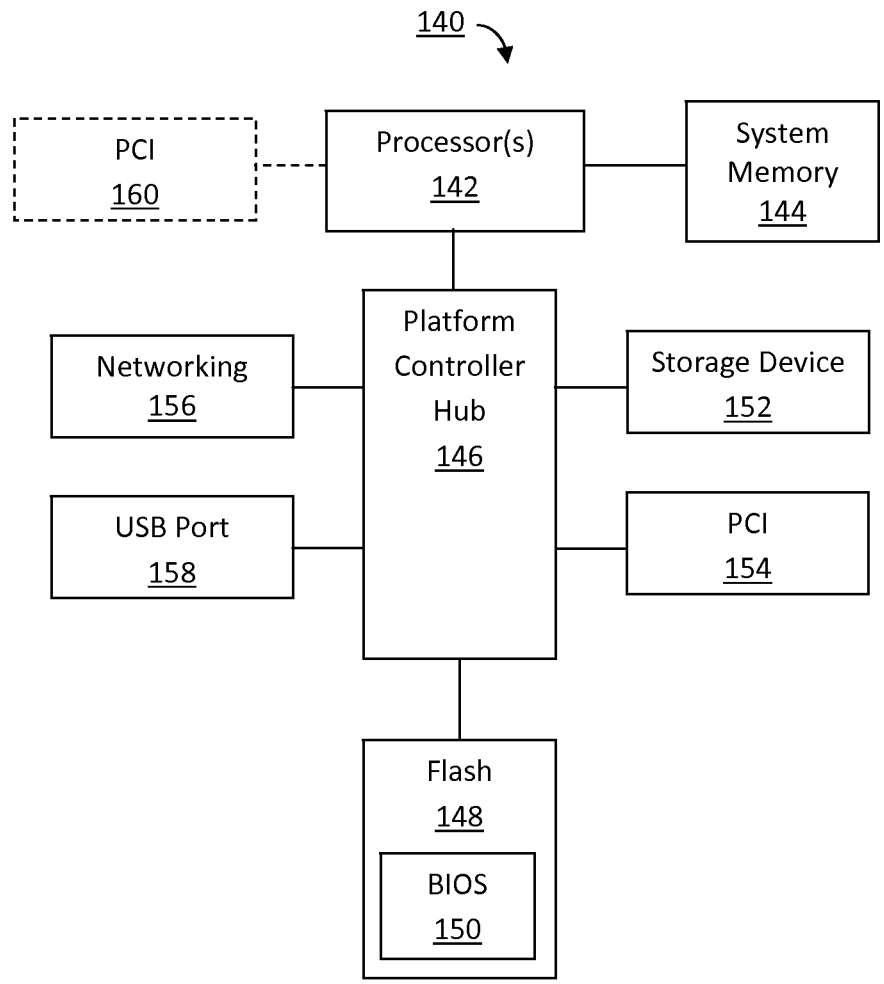
FIG. 1B is a block diagram of another exemplary system according to an alternative embodiment of the invention.

FIG. 1B illustrates an alternative embodiment of a system 140 which implements the principles of the present invention. The system 140 may comprise a processor 142. The processor 142 may comprise any type of processors capable of executing software and/or process data signals. In an embodiment, processor 142 may comprise any type of processors or processor devices as mentioned above with regard to processor 102. In an embodiment, processor 142 may be coupled to system memory 144 via a memory path (not shown) for instruction and data storage and/or for storage of, e.g., graphics commands, data and textures. In another embodiment, processor 142 may be coupled to one or more peripheral component interconnect (PCI) ports 160 via a PCI interconnect; however, in some embodiment, the PCI ports 160 may not be required. Memory 144 may be a hard disk, a floppy disk, random access memory (RAM), read only memory (ROM), flash memory, or any other type of medium readable by processor 142.

Although FIG. 1B shows only one such processor 142, there may be one or more processors in the system 140 and one or more processors may include multiple threads, multiple cores, or the like. The present enhancement is not limited to computer systems or data processing device systems. Alternative embodiments of the present invention can be used in any form factor devices that uses unified extensible firmware interface (UEFI) Basic Input/Output System (BIOS), such as handheld devices and embedded applications. Some examples of handheld devices include cellular phones, Internet Protocol devices, digital cameras, personal digital assistants (PDAs), or handheld PCs such as netbook or notebook. Embedded applications can include a micro controller, a digital signal processor (DSP), system on a chip, network computers (NetPC), set-top boxes, network hubs, wide area network (WAN) switches, or any other system.

The processors 142 may be coupled to a system logic chip 146. For example, the system logic chip 146 in the illustrated embodiment may be a platform controller hub (PCH). In one embodiment, PCH 146 may provide connections to one or more I/O devices, e.g., via a local I/O interconnect. In an embodiment, the local I/O interconnect may be a high-speed I/O bus, such as peripheral component interconnect (PCI) bus. PCH 146 may direct data signals or other information between processor 142 and one or more other components in the system 140 and bridge the data signals or information between processor 142 and system I/O.

Some examples of the one or more components may comprise data storage device 142, one or more PCI port 154, networking control 156, USB port 158. In one embodiment, data storage device 152 may comprise a hard disk drive, a floppy disk drive, a CD-ROM device, a flash memory device, or other mass storage device. Although FIG. 1B shows some examples of the components, PCH 146 may provide connections to other components, such as audio I/O, keyboard/mouse I/O, and other integrated I/O components such as integrated driver electronics (IDE), local area network (LAN) and other serial expansion port, wireless transceiver, legacy I/O controller or the like.

Referring to FIG. 1B, non-volatile memory, such as flash memory 148, may be coupled to PCH 146 via, e.g., a low pin count (LPC) bus. BIOS firmware 150 may reside in flash memory 148 and boot up may execute instructions from the flash memory, or firmware. Although FIG. 1B illustrates BIOS firmware 150 in flash memory 148, in some embodiments, BIOS firmware 150 may be stored in other non-volatile memory such as a firmware hub, or the like. In an embodiment, BIOS firmware 150 may be implemented by Unified Extensible Firmware Interface (UEFI) firmware or any other firmware.

Although FIG. 1B illustrates the system 140, the embodiments according to the invention may be used in any other hardware and software architecture such as a platform using a plurality of processor cores or a platform using a processor or a coprocessor, a platform using I/O hubs, or memory control embedded within the processors, or the like, may be used.

Figure 2:
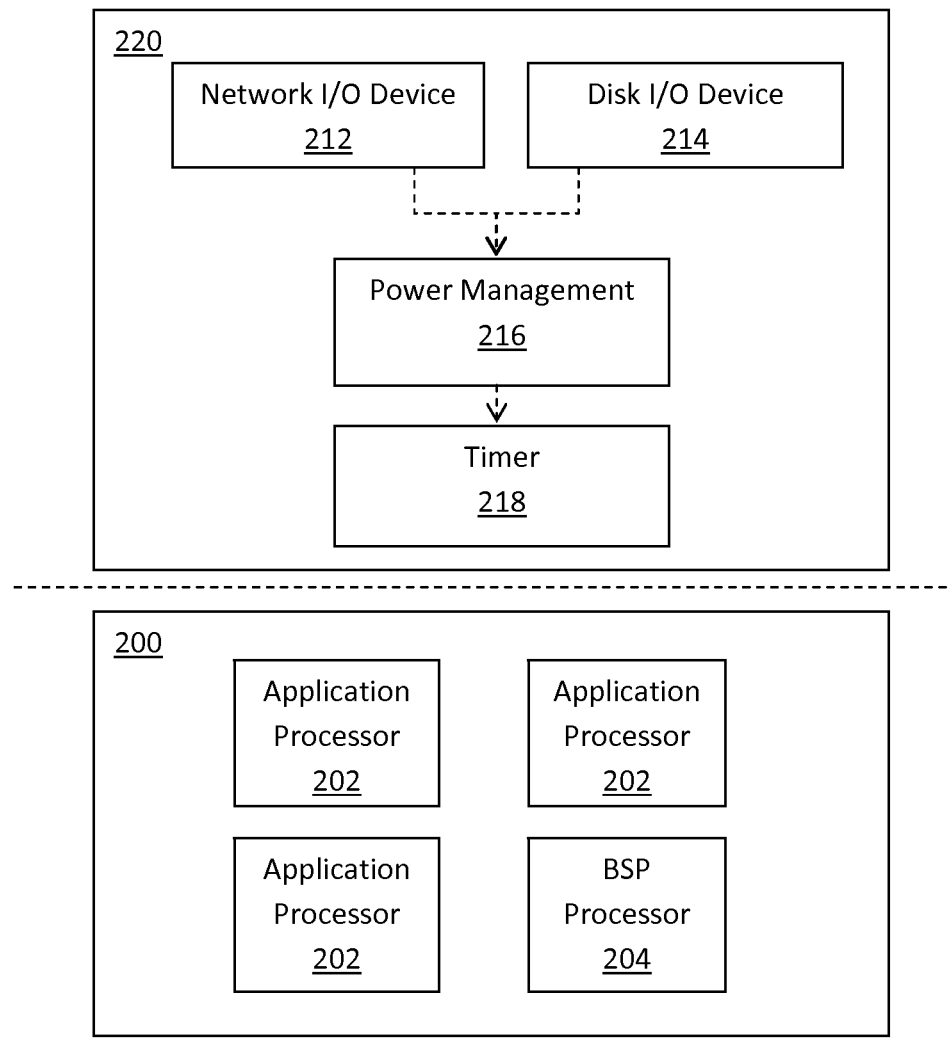
FIG. 2 is a schematic diagram of another exemplary system according to an embodiment of the invention.

FIG. 2 is a block diagram showing hardware and firmware layered view of an embodiment of the invention. Referring to FIG. 2, system 200 may comprise one or more logical processors 202 and a bootstrap processor (BSP) 204. In an embodiment, logical processor 202 may be an application processor (AP) 202. The APs 202 and BSP 204 may execute firmware 220. In another embodiment, the processors may be designated as AP or BSP randomly in response to power on. In an embodiment, firmware 220 may be implemented in BIOS environment, e.g., UEFI environment or any other operating system (OS) absent application environment. While FIG. 2 illustrates four processor cores, in some embodiments, a different number of processor cores may be comprised in the system 200. While FIG. 2 illustrates APs 202 and BSP 204, the embodiments may be used in a system with any other processor cores.

Referring to FIG. 2, in an embodiment, APs 202 and/or BSP 204 may operate in various power modes. In an embodiment, UEFI firmware 220 may provide instructions to instruct APs 202 and/or BSP 204 to operate in a low power mode, including, e.g., P state, C state or any other sleep state, or to disable one or more of the processors. For example, UEFI firmware 220 may provide instructions to instruct APs 202 and/or BSP 204 to operate in P state, wherein the processors may operate under a lowest/lower voltage and/or a lowest/lower frequency. For example, under P state, the APs 202 may not have full computational capability but a portion of the computational capabilities. In another embodiment, under P state, the BSP 204 may have I/O capabilities, e.g., polling for I/O status bit ready. In another embodiment, firmware 220 may provide instructions to instruct the processors 202 and/or 204 to operate in C state, wherein at least one or more components in the processors may be powered down so that the processors may not operate but the status of the processors may be kept. In an embodiment, the BSP processor 204 may have a capability to wake up an AP 202 that is in a sleep state.

In another embodiment, firmware 220 may provide instructions to instruct APs 202 to operate in a disable state, wherein the APs 202 may be disabled. In an embodiment, the disabled APs 202 may be invisible to the BSP 204. In an embodiment, in a disable state, an interrupt wakeup ability may be disabled. In another embodiment, the BSP 204 may operate in P state to pooling for I/O device status bit ready. In one embodiment, the processors in C state may consume less power than in P state. In another embodiment, the BSP 204 may operate in C state when there is no I/O activity.

Referring to FIG. 2, in an embodiment, UEFI firmware 220 may comprise one or more I/O device modules such as a network I/O device module 212 and a disk I/O device module 214. In an embodiment, I/O device module 212 and a disk I/O device module 214 may call a bootstrap stall function in response to an I/O operation or event such as network transfer, network download, hard disk access, virus scan, data backup or any other I/O operation or request such as playing MP3 song, watching a picture/movie in pre boot/prior to OS, offline downloads, Voice over Internet Protocol (VoIP), or the like. Referring to FIG. 2, the I/O device modules may be interfaced to a power management driver or module 216. The UEFI firmware 220 may further provide a timer 218. In one embodiment, the firmware 220 may adjust the timer period of the timer 218 to balance both power consumption and task load.

In one embodiment, the power management module or a control module 216 may be loaded in response to system boot such as the system booting into UEFI mode and never exist into a successive OS, or pre-OS mode. In another embodiment, in response to the main OS (e.g., Windows, Linux, embedded software, and/or graphical user interfaces, or the like) being in a sleep mode (e.g., S3 or S4 environment), the power management module 216 may be loaded. The loaded power management module 216 may disable APs 202 or put APs 202 into a sleep or low power mode, e.g., P or C state in response to the system boot, or the OS sleep mode or other OS absent environment. The main processor such as BSP 204 will still function as normal, e.g., in the sleep or low power mode. In another embodiment, the power management module 216 may be loaded after the APs 202 being disabled or put into the sleep or low power mode.

In response to an I/O operation, I/O device module 212 or 214 may call a boot service stall ( ) function. Before the power management module 216 being loaded, the boot service stall ( ) function may be called. In an embodiment, the BSP 204 may not sleep but may be put in, e.g., P state (which may not be a lowest power state) and may always check I/O ready. In response to the power management module 216 being loaded, the loaded power management module 216 may intercept the original boot service stall function with a flow, e.g., as shown in FIGS. 3A and 3B or 5A and 5B. In response to a stall ( ) function being called by a I/O device module, the loaded power management module 216 may compare a stall delay of the stall ( ) function with a predetermined threshold value. In an embodiment, the threshold value may be a minimal timer period of the timer module 218; however, in some embodiment, the threshold value may not be a minimal timer period. In another embodiment, the threshold value may be determined based on one or more factors such as an accuracy of the timer module 218, or desired power consumption, or other factors.

In response to determining that the stall delay is shorter, the power management module 216 may call the original saved boot service stall ( ) function, wherein BSP 204 always poll for timer I/O until the delay time is satisfied. In response to the ending time of the stall delay, the power management module 216 may exit the stall function.

In another embodiment, in response to the power management module 216 determining that the stall delay is longer, the power management module 216 may further compare the stall delay with the current timer period of the timer 218. In response to determining that the stall delay equals to the current timer period, the timer period of the timer module 218 may put BSP 204 into a lowest power state, e.g., C state, that may consume a lower power than the P state. BSP 204 may be waken up by a timer interrupt event from the timer 218, e.g., at the end of the timer period. BSP 204 may be waken up from the sleep C state. In another embodiment, the power management module 216 may exit the stall ( ) function in response to the timer interrupt. In some embodiments, when the processor is in a low power state, other devices on the bus may not be in the lower power mode. For example, a network interface card (MC) adapter may transmit and receive packets to and from the processor, or hard drive may control direct memory access across a PCI bus when a processor is in a low power mode.

In one embodiment, in response to determining that the stall delay does not equal to the current timer period, the power management module 216 may set the timer period to the stall delay of the stall ( ) function. The power management module 216 may further hook timer interrupt to set a timer event such as a timer callback event. The BSP 204 may be put into a C state and may wake up at the end of the timer period. In the timer interrupt callback function, the power management module 216 may monitor if a continuing or subsequent stall will be called. In response to determining that there will not be a continuing stall, the timer period may be set or revert back to a system default value. In contrast, the power management module 216 may continue checking a continuing stall. In another embodiment, the timer interrupt may be called periodically, and the timer event may be hooked into timer interrupt handler and may be selectively enabled or disabled.

Figure 3A:
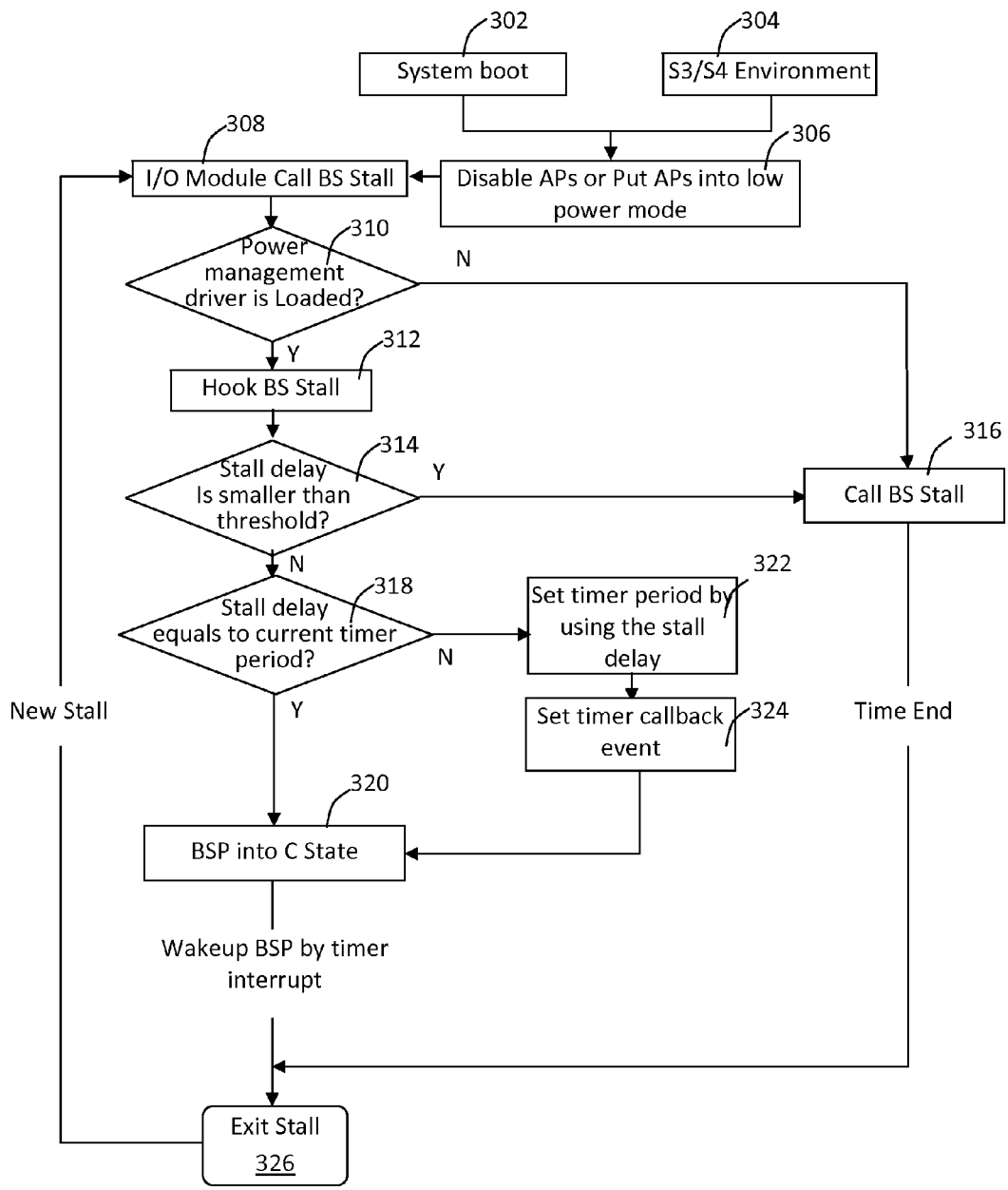
FIGS. 3A and 3B are flow charts in accordance with some embodiments of the invention.
Figure 3B:
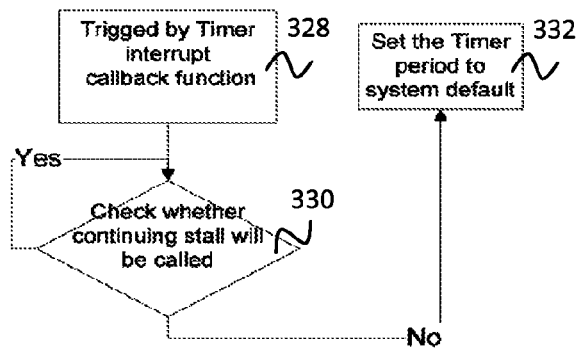

FIGS. 3A and 3B illustrate flow charts of an exemplary method according to an embodiment of the invention. Referring to FIGS. 2 and 3A, in block 302, an exemplary environment is illustrated, wherein a system boot may be performed, e.g., in response to the system 100 being powered on. In an embodiment, BIOS 114 (e.g., UEFI firmware 220) may provide instructions and operations to initialize the system 100 in response to system boot. In an embodiment, the system boot in block 302 may not comprise OS boot stage. In another embodiment, the system boot in block 302 may relate to a pre-OS stage. In block 304, an embodiment of another OS absent environment is illustrated, wherein the system 100 may operate in an S3 environment. In an embodiment, S3 environment may be a sleep mode, a standby mode, or a suspend to RAM mode wherein RAM remains powered. In an embodiment, under S3 environment, OS, applications, open documents or any other software may be disabled. In an embodiment, in the S3 environment, the disabled software may still reside in memory. Although FIG. 3A illustrates the S3 environment, in some embodiments, the flow of FIG. 3A may apply to other OS absent environment, such as S4 environment or system hibernate, wherein main OS (e.g., Windows, Linux, etc.) is in a sleep mode.

In block 306, BIOS 114 may provide instructions and/or operations to put APs 202 into C state or P state or may disable APs 202 in response to the system booting into UEFI 220 (block 302) or the system entering S3 or S4 environment (block 304) or other OS absent environment. In an embodiment, BIOS 114 may provide instructions or operations to boot into UEFI to put APs 202 into P state, C state or disable state and may not exit UEFI into a successive OS. In another embodiment, the system 100 may not enter OS but may operate in an OS absent application environment, wherein BIOS 114 or UEFI firmware 220 is the executive environment.

The flow may go to block 308. In block 308, in response to an I/O operation such as a network I/O operation or a hard disk I/O operation or the like, the corresponding I/O device modules 212 or 214 may be executed by BSP 204 to call a boot service stall function. The flow may go to diamond 310, wherein BSP 204 may check whether the power management driver for the power management module 216 is loaded. Referring to FIG. 3, in block 316, in response to determining that the power management driver is not loaded, the boot service stall function is called.

In diamond 310, in response to determining that the power management driver is loaded, the flow may go to block 312, wherein the power management module 216 may be configured to hook the boot service stall function. In diamond 314, the power management module 216 may be configured to check if a stall delay of the boot service stall function is smaller than a predetermined threshold. In response to determining that the stall delay is smaller than the predetermined threshold (diamond 314), the flow may go to block 316 to call the boot service stall function.

In contrast, if the result of diamond 314 indicates that the stall delay is not smaller than the predetermined threshold, the flow may go to block 316 to check if the stall delay equals to the current timer period of the timer module 218, e.g., a system default value. In block 318, in response to determining that the stall delay equals to the current timer period, the power management module 216 may be configured to put BSP 204 into C state during the stall delay or the current timer period. In block 320, a timer interrupt may be triggered at the end of the stall delay or the timer period and the power management module 216 may wake up BSP 204. In an embodiment, BSP 204 may be wake up and may exit the stall function in block 326. The wake up BSP 204 may check I/O ready status bit. If it is determined that I/O ready status bit is set, BSP 204 may exit execute the I/O operation. Contrarily, if the wake up BSP 204 determines that I/O ready status bit is not set during the stall delay, BSP 204 may not perform the I/O operation. In another embodiment, if the wake up BSP 204 determines that I/O ready status bit is not set during the stall delay, corresponding I/O device module 212 or 214 may call another BS stall function, e.g., according to 308 to 326.

Referring again to FIG. 3A, in response to determining that the stall delay does not equal to the current timer period (diamond 318), the power management module 216 may be configured to set the timer period to the stall delay (block 322). In block 324, the power management module 216 may set a timer callback event. Referring to FIG. 3B, in an embodiment, a timer interrupt callback function may be called in response to the setting of timer callback event (block 328). In diamond 330, in the timer interrupt callback function, the power management module 216 may monitor if a continuing stall will be called. In response to determining that there will not be a continuing stall, the timer period may be set or revert back to a system default value. In contrast, the power management module 216 may continue checking a continuing stall in diamond 330. Referring back to FIG. 3A, the flow may go to block 320 in response to the timer call back event is set in block 324.

Figure 4A:
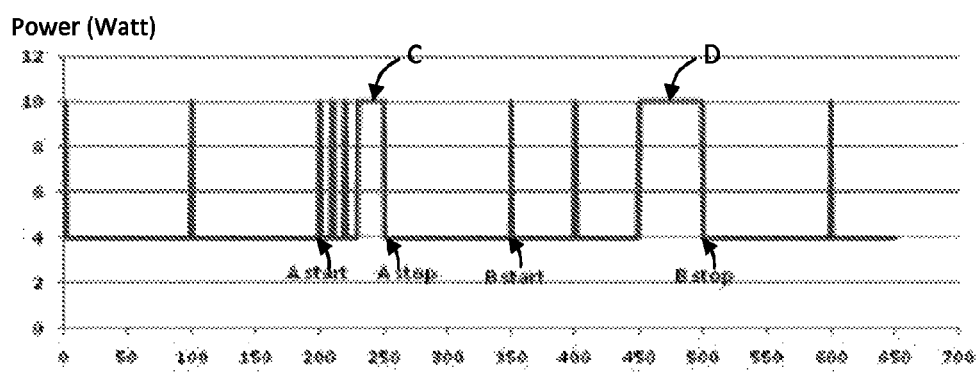
FIGS. 4A and 4B are schematic diagrams of exemplary changes of timer period in accordance with some embodiments of the invention.
Figure 4B:
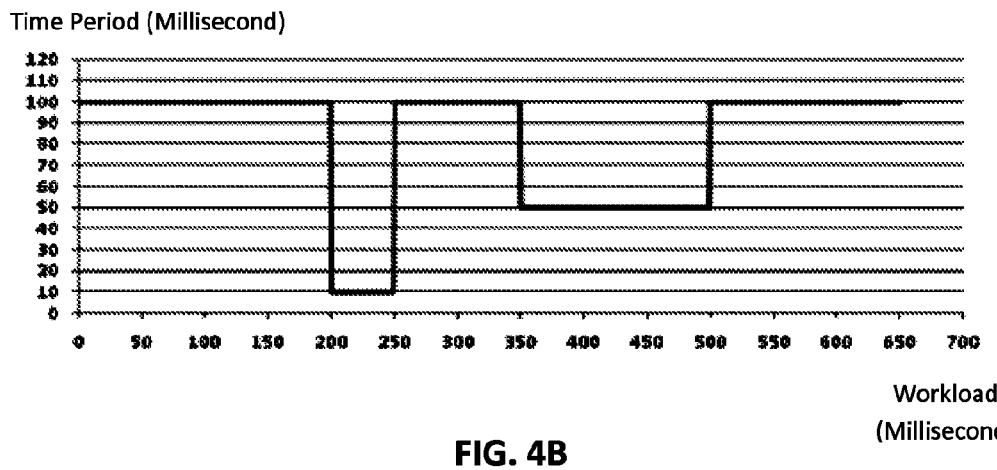

FIGS. 4A and 4B illustrate exemplary embodiments to show a change of timer period based on workload of the system I/O load. Referring to FIGS. 4A and 4B, a default timer period may be 100 milliseconds. At the time of 200 milliseconds, task A starts an I/O operation and the power management module 216 may adjust the timer period to, e.g., 10 milliseconds according to the stall delay of a BS stall function corresponding to the I/O operation. BSP 204 may remain in a lower power state during each 10-millisecond period. In an embodiment, BSP 204 may be set to a higher power state to check I/O status bit every 10 milliseconds. At the time of 230 milliseconds, BSP 204 finds that the status bit is set and then may perform task A for 20 milliseconds as illustrated by C in FIG. 4A. In response to BSP 204 completing the I/O operation at the time of 250 milliseconds, the power management module 216 may be executed to revert the timer period of 10 milliseconds back to 100 milliseconds, as shown in FIG. 4B.

Referring to FIG. 4A, at the time of 350 milliseconds, task B starts an I/O operation. The power management module 216 may be configured to adjust the timer period to 50 milliseconds according to the I/O operation. BSP 204 may remain in a lower power state, e.g., C state, during each 50-millisecond timer period. BSP 204 may be set to a higher power state, P state, to check I/O status bit every 50 milliseconds. When BSP 204 detects status bit is set at the time of 450 milliseconds, it may performs task for 50 milliseconds (illustrated by D in FIG. 4A). When BSP 204 completes the I/O operation at the time of 450 milliseconds, the power management module 216 may revert the 50-millisecond timer period back to a default value, e.g., 100 milliseconds again.

In an embodiment, I/O device modules 212 and 214 may not be aware of the changes in the stall services. In another embodiment, the stall delay of a stall function for an I/O operation may be predetermined to be longer than the determined threshold and the processors may be stay in a low power state, e.g., C state, according to the flow of FIGS. 3A and 3B.

Figure 5A:
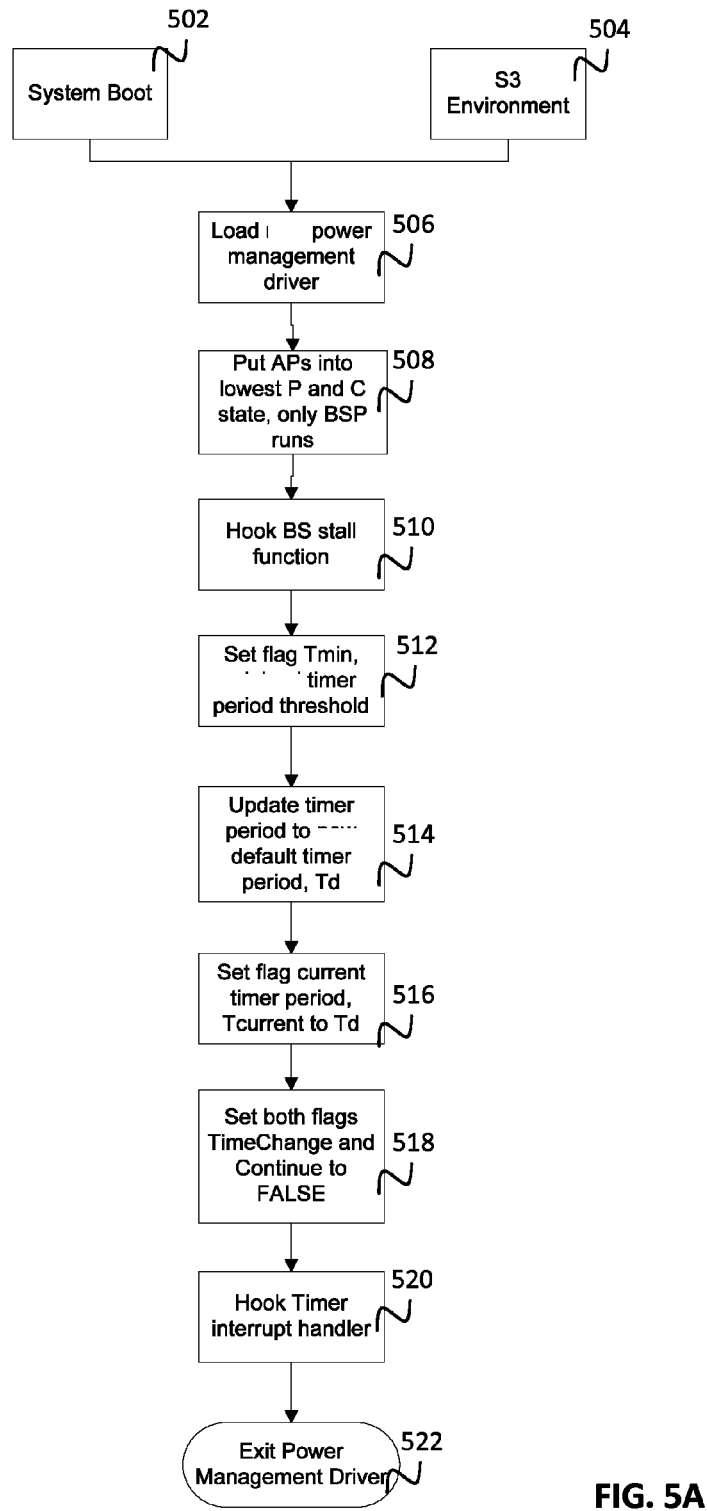
FIGS. 5A and 5B are flow charts in accordance with some embodiments of the invention.
Figure 5B:
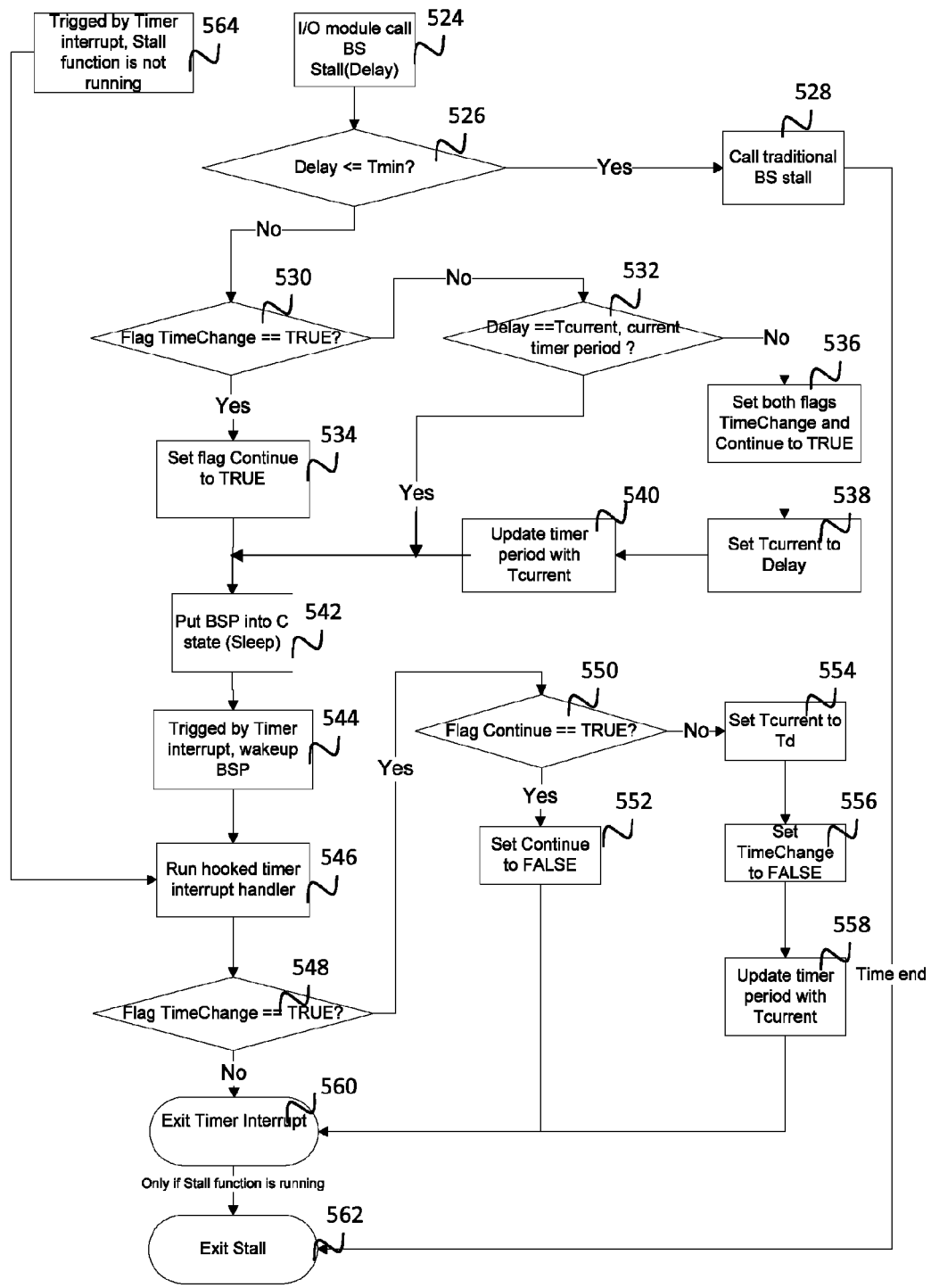

FIGS. 5A and 5B illustrate flow charts of an exemplary method according to an embodiment of the invention. Referring to FIG. 5A, the description on blocks 502 and 504 may be similar to blocks 302 and 304, respectively. In block 506, a power management driver for the power management module 216 may be loaded. In block 508, the power management driver may put one or more APs 204 into a P state, a C state or a disable state. In block 510, the power management driver may hook a BS stall function. In block 512, the power management driver may set a flag Tmin that may indicate a threshold value relating to the timer 218. In block 514, the power management driver may update a timer period of the timer 218 to a default timer period Td. In block 516, the power management driver may set a flag Tcurrent to Td. For example, the flag Tcurrent may indicate the current timer period In block 518, the power management driver may set a flag TimerChange and a flag Continue to FALSE. The flag TimerChange may indicate if the timer period is to be changed. The flag Continue may indicate if there is a continuing stall function to be called. In block 520, the power management driver may hook a timer interrupt handler. In block 522, the flow may exit the power management driver. In one embodiment, the flow of blocks 506 to 522 may be used for the initialization of the power management driver.

Referring to FIG. 5B, in block 524, in response to an I/O operation such as a network I/O operation or a hard disk I/O operation or the like, the corresponding I/O device modules 212 or 214 call a boot service stall function. In diamond 526, the power management module 216 may check whether a stall delay of the boot service stall function is smaller than Tmin, e.g., a predetermined threshold. In response to determining that the stall delay is smaller than the predetermined threshold, the flow may go to block 528 to call the boot service stall function. The flow in block 528 may refer to the block 316 of FIG. 3A.

In diamond 530, the power management module 216 may be configured to check if the flag TimerChange equals to TRUE. In block 534, in response to the flag TimerChange equal to TRUE, the power management module 216 may set flag Continue to TRUE in block 534. In contrast, in response to determining that the flag TimerChange does not equal to TRUE, the power management module 216 may further determine if the stall delay equals to the flag Tcurrent in diamond 532. In response to determining that the stall delay and the flag Tcurrent is equal (diamond 532), the flow may go to block 542. In contrast, the flow may go to block 536, wherein the power management module 216 may set flag TimeChange and flag Continue to TRUE. In block 538, power management module 216 may set flag Tcurrent to the stall delay. In block 540, power management module 216 may update the timer period of the timer 218 based on the Tcurrent.

In block 542, the power management module 216 may put BSP 204 into a C state. In block 544, BSP 204 may be wake up by a timer interrupt, e.g., at the end of the timer period. The BSP 204 may check I/O ready when waking up. In block 564, as triggered by the timer interrupt, the stall function is not running. The flow goes to block 564 to run the timer interrupt handler that is hooked in block 520 during power management driver initialization.

In diamond 548, the power management module 216 may check if the flag TimerChange is true. In block 560, in response to determining that the flag TimerChange is not true, power management module 216 may exit the timer interrupt. In contrast, the flow may go to diamond 550, wherein it is to check flag Continue is TRUE. If the flag Continue is not TRUE, the flow may go to block 552, wherein the power management module 216 may set flag Continue to FALSE and then flow may exit timer period. If the flag Continue is not TRUE (diamond 550), the flow may go to block 554, wherein the Tcurrent is set to Td. In block 556, the TimerChange flag is set to FALSE and the timer period of the timer 218 is updated with the Tcurrent and the flow may go to 560. In 562, after exiting the timer interrupt, if the stall function is still running, the flow may go to 562 to exit the stall function.

While the methods of FIGS. 3A, 3B, 5A and 5B are illustrated to comprise a sequence of processes, the methods in some embodiments may perform illustrated processes in a different order.

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. A system, comprising:
a memory;
a plurality of processor cores that couples to the memory;
a basic input output system (BIOS) that couples to the processor cores, wherein the basic input output system comprises:
an I/O device module to call a first stall function in response to an I/O operation;
a power management module that couples to the I/O device module; and
a timer module that couples to the power management module,
wherein the power management module is to call the first stall function in response to determining that a stall delay of the first stall function is shorter than a threshold, to put a boot strap processor core of said plurality of processor cores in a sleep state in response to determining that the stall delay is not shorter than the threshold and the stall delay equals to a timer period of the timer module, to set the timer period to the stall delay in response to determining that said stall delay is not shorter than the threshold and the stall delay is not equal to said timer period, to set the timer period to a default value in response to detecting that a second stall function is not to be called in a timer callback event, and to wake up the boot strap processor core at the end of the timer period.

2. The system of claim 1, wherein the BIOS is to call the first stall function in response to determining that a power management driver for the power management module is not loaded.

3. The system of claim 1, wherein the power management module is further to hook the first stall function if a power management driver for the power management module is loaded.

4. The system of claim 1, wherein the power management module is further to put one or more logical processor cores into the sleep state in response to the first stall function from the I/O device module.

5. A method, comprising:
putting a logical processor core in a disable mode or a sleep mode;
in response to a stall function relating to an I/O operation, hooking the stall function;
comparing a stall delay of the stall function with a minimal timer period of a timer;
in response to determining that the stall delay is smaller than the minimal timer period, calling the stall function;
in response to determining that the stall delay is not smaller than the minimal timer period and the stall delay does not equal to a current timer period of the timer, setting the current timer period to the stall delay;
in response to determining that the stall delay is not smaller than the minimal timer period and the stall delay equals to the current timer period, setting a boot strap processor core in the sleep mode;
setting the current timer period to a default value in response to detecting that a subsequent stall function is to not be called; and
waking up the boot strap processor core at the end of the current timer period.

6. The method of claim 5, further comprising:
setting a timer event to monitor the subsequent stall function.

7. The method of claim 5, wherein the logical processor core is put in the disable mode or the sleep mode in an operation software application absent operation.

8. The method of claim 5, wherein the boot strap processor core is woken up by a timer interrupt at the end of the current timer period to detect I/O ready for the I/O operation.

9. The method of claim 6, further comprising:
setting the current timer period to a default value in response to determining that there is not the subsequent stall.

10. A non-transitory machine readable medium comprising machine readable code that in response to being executed result in a computing system to
entering a basic input and output system of the computing system;
using the basic input and output system to put a logical processor in the computing system in a sleep mode or a disable mode; and
using the basic input and output system to hook a stall function for a I/O operation;
using the basic input and output system to call the stall function in response to determining that a stall delay of the stall function is smaller than a minimal timer period of a timer;
using the basic input and output system to put a boot strap processor in the sleep mode during a stall delay of the stall function in response to determining that a stall delay of the stall function is not smaller than the minimal timer period and the stall delay equals to a current timer period of the timer;
using the basic input and output system to set a timer event to monitor if there is a continuing stall function to be called; and
using the basic input and output system to set the current timer period to a default value in response to determining that there is not a continuing stall function to be called.

11. The non-transitory machine readable medium of claim 10, wherein the machine readable medium further comprising machine readable code to
using the basic input and output system to set the current timer period to equal to the stall delay in response to determining that the stall delay is not smaller than the minimal timer period.

12. The non-transitory machine readable medium of claim 10, wherein the basic input and output system is implemented by unified extensible firmware interface.

* * * * *